(12) United States Patent
Kurihara et al.

(10) Patent No.: US 10,405,409 B2
(45) Date of Patent: Sep. 3, 2019

(54) LIGHTING APPARATUS, COMMUNICATION METHOD PERFORMED BY LIGHTING APPARATUS, AND LIGHTING SYSTEM

(71) Applicant: PANASONIC INTELLECTUAL PROPERTY MANAGEMENT CO., LTD., Osaka (JP)

(72) Inventors: Shinichiro Kurihara, Osaka (JP); Tomoaki Mannami, Osaka (JP); Kouichi Mitsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/895,952

(22) Filed: Feb. 13, 2018

(65) Prior Publication Data

US 2018/0235061 A1    Aug. 16, 2018

(30) Foreign Application Priority Data

Feb. 15, 2017    (JP) .................................. 2017-026436

(51) Int. Cl.
*H05B 37/02* (2006.01)
*H04B 10/114* (2013.01)
*H04W 12/00* (2009.01)
*H04W 76/10* (2018.01)
*H05B 33/08* (2006.01)
*H04L 9/12* (2006.01)
*H04L 29/06* (2006.01)
*H04W 12/02* (2009.01)
*H04W 84/18* (2009.01)

(52) U.S. Cl.
CPC ....... *H05B 37/0272* (2013.01); *H04B 10/114* (2013.01); *H04L 9/12* (2013.01);
(Continued)

(58) Field of Classification Search
CPC ............ H05B 37/0272; H05B 33/0842; H05B 33/0863; H05B 33/0827; H05B 37/0245;
(Continued)

(56) References Cited

U.S. PATENT DOCUMENTS 6,587,441 B1 * 7/2003 Urban .................... H04L 1/1867
370/310
7,778,164 B2 * 8/2010 Shimonishi ........... H04L 1/1874
370/229

(Continued)

FOREIGN PATENT DOCUMENTS

JP    2013-048014 A    3/2013

*Primary Examiner* — Vibol Tan
(74) *Attorney, Agent, or Firm* — McDermott Will & Emery LLP

(57) ABSTRACT

A lighting apparatus among a plurality of lighting apparatuses in a wireless mesh network in a lighting system including the plurality of lighting apparatuses and a terminal which performs wireless communication with the lighting apparatus includes: a communication circuit which performs wireless communication; and a controller which controls the communication circuit. The controller establishes a connection with the terminal. When another lighting apparatus included in the plurality of lighting apparatuses transmits a signal (second signal) to the terminal using wireless communication, the controller receives the second signal via the communication circuit, and transmits the second signal to the terminal via the communication circuit.

9 Claims, 7 Drawing Sheets

(52) U.S. Cl.
CPC ....... *H04L 63/0428* (2013.01); *H04W 12/003* (2019.01); *H04W 12/02* (2013.01); *H04W 76/10* (2018.02); *H05B 33/0863* (2013.01); *H04L 2209/80* (2013.01); *H04W 84/18* (2013.01)

(58) Field of Classification Search
CPC ... Y02B 20/48; F21V 23/003; F21V 23/0435; G08C 17/02; G08C 2201/93; H04L 12/2816; H04L 2012/2841; H04M 1/7253; H04W 4/80
See application file for complete search history.

(56) References Cited

U.S. PATENT DOCUMENTS

| | | | | |
|---|---|---|---|---|
| 7,778,195 B2* | 8/2010 | Takai | ................ | H04M 3/2236 370/252 |
| 8,686,664 B2* | 4/2014 | Herbst | ................ | H04L 41/0803 315/297 |
| 8,768,251 B2* | 7/2014 | Claus | ................ | H04W 12/06 455/41.2 |
| 9,807,621 B1* | 10/2017 | Hui | ................ | H04W 24/10 |
| 9,826,605 B2* | 11/2017 | Vora | ................ | H05B 37/029 |
| 9,948,516 B2* | 4/2018 | Turon | ................ | H04W 4/80 |
| 9,967,956 B2* | 5/2018 | Vora | ................ | H05B 37/0272 |
| 2008/0287062 A1* | 11/2008 | Claus | ................ | H04W 12/02 455/41.2 |
| 2013/0063042 A1* | 3/2013 | Bora | ................ | H05B 33/0863 315/292 |
| 2014/0252958 A1* | 9/2014 | Subotnick | ................ | H05B 37/0218 315/149 |
| 2015/0372875 A1* | 12/2015 | Turon | ................ | H04W 76/10 370/254 |
| 2017/0202076 A1* | 7/2017 | Kurihara | ................ | H05B 33/0845 |
| 2017/0208671 A1* | 7/2017 | Kurihara | ................ | H04W 4/70 |
| 2017/0347335 A1* | 11/2017 | Yi | ................ | H04W 68/02 |

* cited by examiner

LIGHTING APPARATUS, COMMUNICATION METHOD PERFORMED BY LIGHTING APPARATUS, AND LIGHTING SYSTEM

CROSS REFERENCE TO RELATED APPLICATION

This application claims the benefit of priority of Japanese Patent Application Number 2017-026436 filed on Feb. 15, 2017, the entire content of which is hereby incorporated by reference.

BACKGROUND

1. Technical Field

The present disclosure relates to a lighting apparatus among a plurality of lighting apparatuses in a wireless mesh network in a lighting system. The lighting system includes the plurality of lighting apparatuses and a terminal which performs wireless communication with the lighting apparatus.

2. Description of the Related Art

A technique for performing control such as turn on and off, etc. of each of the plurality of lighting apparatuses by performing wireless communication with the plurality of lighting apparatuses has been conventionally known (for example, see Japanese Unexamined Patent Application Publication No. 2013-48014 (PTL 1)).

The lighting system according to PTL 1 includes a plurality of lighting apparatuses capable of performing wireless communication and a controller which transmits a turn-on instruction to the plurality of lighting apparatuses. The controller multicasts the turn-on instruction to the plurality of lighting apparatuses. In this way, the controller can turn on the plurality of lighting apparatuses simultaneously.

SUMMARY

When a terminal which is a controller for performing control such as turn on or off, etc. of a lighting apparatus transmits, as a signal, an instruction from an operator of the terminal, the lighting apparatus which received the signal may transmit a signal indicating the reception of the former signal to the terminal.

The terminal described above may have a plurality of channels depending on a certain receiver for receiving a signal of the terminal. In this case, the receiver can receive the signal supported by the plurality of channels is placed into a state where the plurality of channels are repeatedly switchable.

However, the receiver may be in a state where no signal is receivable, depending on a timing at which channels are switched. In this case, when the lighting apparatus transmitted a signal to the terminal, a communication trouble that the terminal cannot receive the signal occurs. In short, a problem of decrease in communication reliability arises.

In view of this, the present disclosure provides a lighting apparatus etc. having increased communication reliability.

A lighting apparatus according to an aspect of the present disclosure is a lighting apparatus among a plurality of lighting apparatuses in a wireless mesh network in a lighting system including: the plurality of lighting apparatuses; and a terminal which performs wireless communication with the lighting apparatus. The lighting apparatus includes: a communication circuit which performs wireless communication; and a controller which controls the communication circuit. The controller establishes a connection with the terminal. When another lighting apparatus included in the plurality of lighting apparatuses transmits a signal to the terminal using wireless communication, the controller receives the signal via the communication circuit, and transmits the signal to the terminal via the communication circuit.

In addition, a communication method according to an aspect of the present disclosure is a communication method performed by at least one of a plurality of lighting apparatuses in a wireless network in a lighting system. The lighting system includes the plurality of lighting apparatuses and a terminal which performs wireless communication with the lighting apparatus. The communication method includes: receiving a signal when another lighting apparatus included in the plurality of lighting apparatuses transmits the signal to the terminal using the wireless communication; and transmitting the signal to the terminal.

In addition, a lighting system according to an aspect of the present disclosure is a lighting system including: a bridge lighting apparatus; one or more mesh lighting apparatuses; and a terminal. The bridge lighting apparatus and the one or more mesh lighting apparatuses constitute a wireless mesh network. The terminal is configured to perform wireless communication with the bridge lighting apparatus and the one or more mesh lighting apparatuses. The bridge lighting apparatus includes: a communication circuit which performs wireless communication; and a controller which controls the communication circuit. The controller establishes a connection with the terminal. When one of the one or more mesh lighting apparatuses transmits a signal to the terminal using wireless communication, the controller receives the signal via the communication circuit, and transmits the signal to the terminal via the communication circuit.

The lighting apparatus etc. according to an aspect of the present disclosure increases communication reliability.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, lighting apparatuses according to embodiments are described with reference to the drawings. Each of the embodiments described below shows a general or specific example. The numerical values, shapes, materials, constituent elements, the arrangement and connection of the constituent elements, steps, the processing order of the steps etc. shown in the following embodiments are mere examples, and therefore do not limit the scope of the present disclosure. Therefore, among the constituent elements in the following embodiments, constituent elements not recited in any one of the independent claims that define the most generic inventive concept are described as arbitrary constituent elements.

It is to be noted that each of the drawings is a schematic diagram that is not always illustrated precisely. In addition, in each diagram, substantially the same constituent elements are assigned the same reference signs, and overlapping descriptions may be omitted or simplified.

EMBODIMENT

[Configuration of Lighting Apparatus]

Figure 1:
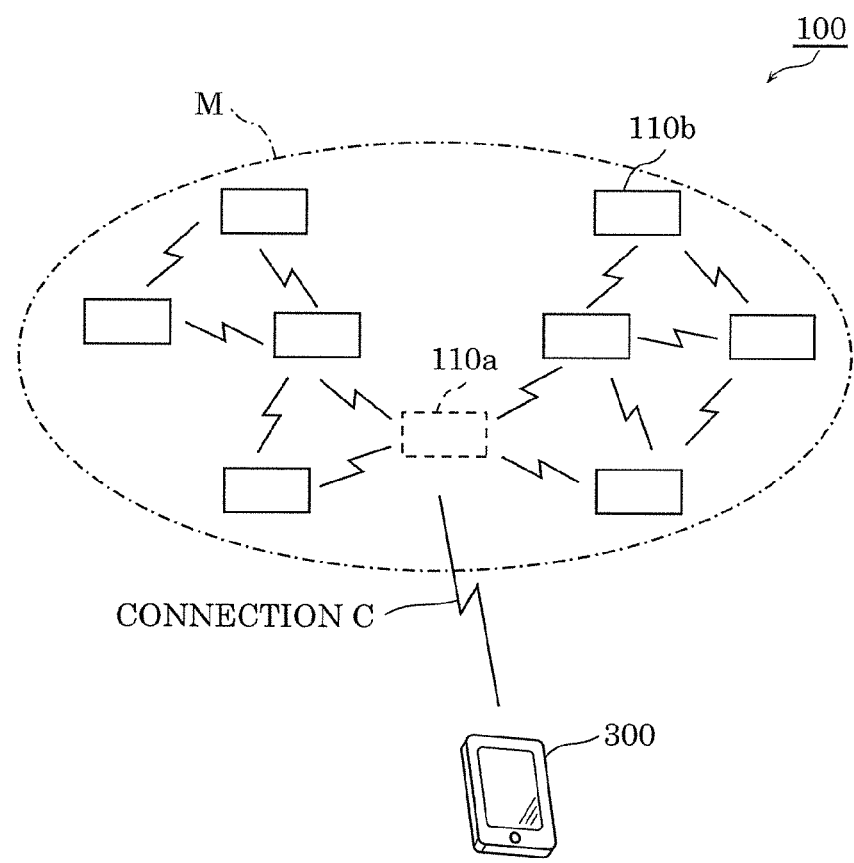
FIG. 1 is a diagram for illustrating a lighting system including lighting apparatuses according to an embodiment.

FIG. 1 is a diagram for illustrating a lighting system including a lighting apparatus according to an embodiment.

As illustrated in FIG. 1, lighting system 100 includes: lighting apparatus 110a; a plurality of lighting apparatuses 110b; and terminal 300. It is to be noted that, in a range enclosed by alternate long and short dash lines in FIG. 1, a rectangle represented by dotted lines shows lighting apparatus 110a and a plurality of (eight in FIG. 1) rectangles represented by solid lines show lighting apparatuses 110b. It is to be noted that the number of lighting apparatuses included in lighting system 100 is not limited particularly. FIG. 1 illustrates an example of lighting system 100.

Lighting apparatuses 110a and 110b emit illumination light. Lighting apparatuses 110a and 110b are, for example, downlights, ceiling lights, spotlights, or the like. Lighting apparatuses 110a and 110b are capable of performing wireless communication between them.

Lighting apparatus 110a is wirelessly connected to terminal 300 which is operated by an operator. Lighting apparatus 110a performs control such as turn on or off or the like according to a signal received from terminal 300. It should be noted that, in this example, lighting apparatus 110a and terminal 300 are in connection-oriented communication.

Connection-oriented communication is a connection method (communication method) for transmitting and receiving a signal via an exclusive virtual communication path (connection C) established between apparatuses before starting the transmission and reception of a signal. On the other hand, connectionless communication described later is a communication method for transmitting and receiving a signal without establishing a dedicated communication path between apparatuses.

According to the communication method using the connection-oriented communication, a fact that a communication partner to which the signal was transmitted has received the signal is confirmed. More specifically, according to the communication method using the connection-oriented communication, a signal (i.e., data) desired to be transmitted is surely communicated (in other words, transmitted) at interval periods defined as predetermined connection intervals (i.e., communication periods). When the number of data desired to be transmitted is not plural, data having a data format called empty Protocol Data Unit (PDU) is transmitted to maintain the communication between them. Data desired to be transmitted is transmitted using a predefined communication protocol etc. (what is called a profile) while communication is being performed at the connection intervals. When there is no communication (here, response) in an interval period, the data is re-transmitted. For this reason, the communication method using the connection-oriented communication is less likely to cause a signal transmission or reception error.

Here, lighting apparatus 110a, lighting apparatuses 110b, and terminal 300 have different network segments. For this reason, lighting apparatus 110a and terminal 300 are connected by bridge connection.

Bridge connection is a connection method for connecting, as the same network segments, different network segments by performing a software process or by using a hardware bridge or the like.

In other words, terminal 300 has been connected only to lighting apparatus 110a by bridge connection, and connection C which is less likely to cause a signal transmission or reception error has been established. Stated differently, lighting apparatus 110a is in a bridge connection state where connection C with terminal 300 has been established.

Lighting apparatus 110a and the plurality of lighting apparatuses 110b are present on the same wireless mesh network M.

A wireless mesh network is a communication network formed in a mesh by means of a plurality of apparatuses which have wireless communication functions transmitting and receiving signals between them. A signal (mesh signal) is transferred on the wireless mesh network in a bucket brigade manner. For this reason, when any one of the apparatuses in the wireless mesh network is connected to an external network such as the Internet, the other apparatuses in the wireless mesh network can receive a signal, received by the one apparatus from the external network, via the wireless mesh network. For example, the communication system employed for wireless mesh network M of lighting system 100 according to this embodiment may be Flood Mesh.

In lighting system 100, lighting apparatus 110a receives a signal from terminal 300 via connection C, and transfers the received signal to the plurality of lighting apparatuses 110b via wireless mesh network M. Terminal 300 and lighting apparatus 110a are connected to perform communication wirelessly using, for example, Wi-Fi (registered trademark), Bluetooth (registered trademark), or Bluetooth (registered trademark) Low Energy (BLE). Lighting apparatus 110a and lighting apparatuses 110b are connected to perform wireless communication using, for example, Wi-Fi (registered trademark), Bluetooth (registered trademark), Bluetooth (registered trademark) Low Energy (BLE), or Zig-Bee (registered trademark).

Terminal 300 is a communication terminal having a signal transmitting function for transmitting a signal for performing control such as turn on or off, etc. of lighting apparatuses 110a and 110b. When lighting apparatuses 110a and 110b receive a signal from terminal 300, each of lighting apparatuses 110a and 110b returns a signal indicating the reception of the signal to terminal 300. For this reason, terminal 300 further has a signal receiving function. Terminal 300 is, for example, a remote controller, a smartphone, or the like having signal transmitting and receiving functions.

It is to be noted that, in the descriptions below, a signal which terminal 300 transmits to control lighting apparatus 110a and/or lighting apparatuses 110b may be referred to as a first signal. In addition, a response signal which is transmitted by lighting apparatus 110a and/or lighting apparatuses 110b to notify the reception of the first signal (specifically, to notify reception of the first signal including information related to control of the lighting apparatuses) in response to the first signal may be referred to as a second signal.

Figure 2:
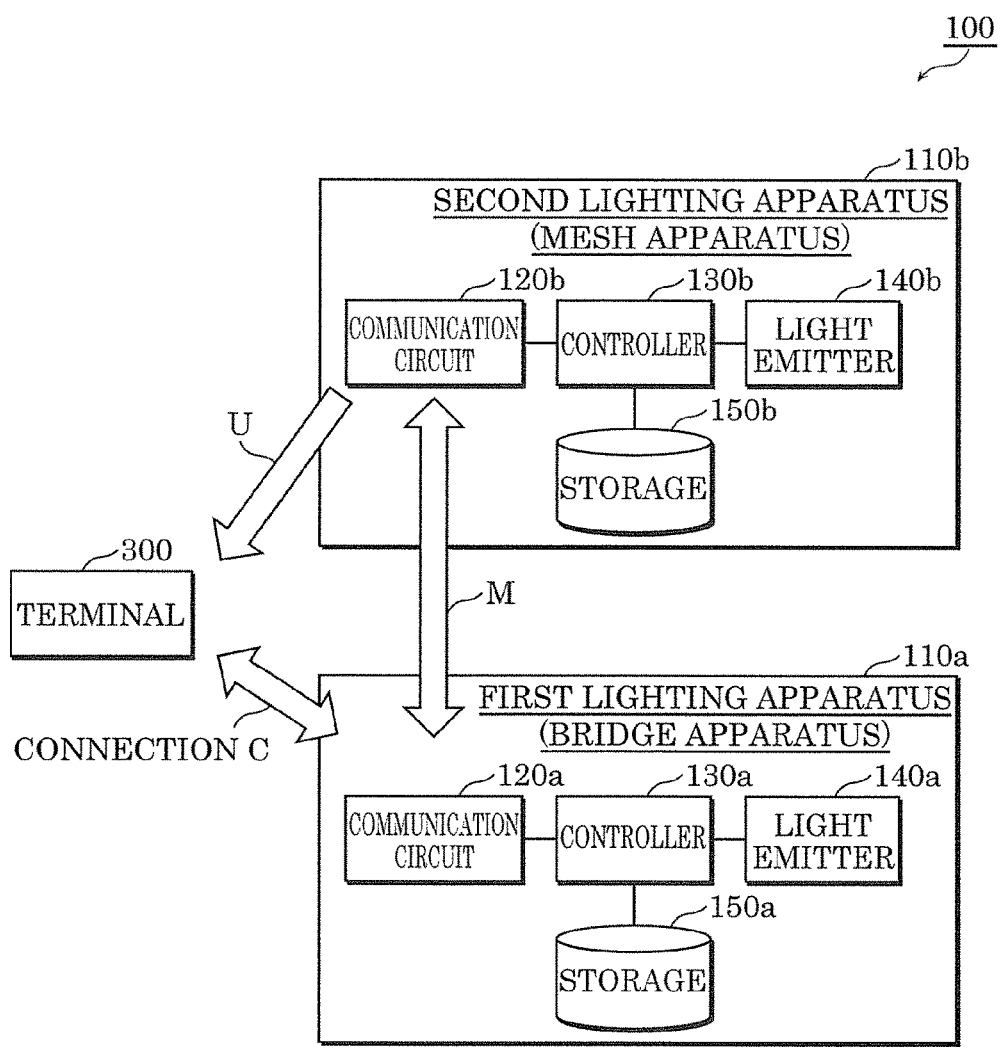
FIG. 2 is a block diagram illustrating unique functional configurations of lighting apparatuses according to this embodiment.

FIG. 2 is a block diagram for illustrating functional configurations of lighting apparatus (first lighting apparatus or bridge apparatus) 110a and lighting apparatus (second lighting apparatus or mesh apparatus) 110b according to this embodiment. It is to be noted that lighting system 100 includes one or more lighting apparatuses 110b although only one lighting apparatus 110b is illustrated for explanation.

As illustrated in FIG. 2, lighting apparatus (first lighting apparatus) 110a includes: communication circuit 120a; controller 130a, light emitter 140a; and storage 150a. Lighting apparatus (second lighting apparatus) 110b includes: communication circuit 120b; controller 130b, light emitter 140b; and storage 150b. In other words, lighting apparatus 110a and lighting apparatus 110b are identical to each other in the unique functional configuration including the communication circuit, the controller, the light emitter, and the storage. Stated differently, in lighting system 100 including the plurality of lighting apparatuses, the lighting apparatus for which connection C with terminal 300 has been established is lighting apparatus (first lighting apparatus) 110a, and the other lighting apparatus for which connection C with terminal 300 has not been established is lighting apparatus (second lighting apparatus) 110b.

Lighting apparatus 110a and lighting apparatus 110b operate differently depending on the state of connection with terminal 300, specifically, depending on whether or not connection C with terminal 300 has been established.

First, a description is given of lighting apparatus 110a for which connection C with terminal 300 has been established.

Communication circuit 120a is a communication interface for allowing lighting apparatus 110a to perform wireless communication with terminal 300 and lighting apparatus 110b.

Controller 130a is a control device which controls communication circuit 120a. In addition, controller 130a performs control such as turn on or off or the like of light emitter 140a according to a first signal received from terminal 300. Controller 130a is represented by, for example, a central processing unit (CPU) and a control program stored in storage 150a.

Controller 130a generates a second signal indicating the reception of the first signal when receiving the first signal via communication circuit 120a, and transmits the second signal to terminal 300.

It is to be noted that, when the first signal has been encrypted, controller 130a decrypts the first signal in the case where an encryption key for decrypting the encrypted first signal has been stored, and generates a second signal indicating the reception of information relating to control of lighting apparatus 110a included in the first signal. It should be noted that a key for decrypting an encrypted signal is also referred to as an encryption key in the present application. In addition, controller 130a transmits the second signal to terminal 300 via communication circuit 120a.

When lighting apparatus 110b (another lighting apparatus) transmitted a second signal to terminal 300 by wireless communication, controller 130a intercepts the transmitted second signal via communication circuit 120b, and transfers the intercepted second signal to terminal 300 via communication circuit 120b.

Controller 130a intercepts the second signal transmitted by lighting apparatus 110b via communication circuit 120a by scanning a channel for use in wireless communication. For example, a plurality of channels are used when Bluetooth (registered trademark) is employed as a communication standard, and one channel is used when Zig-bee (registered trademark) is employed as a communication standard. Controller 130a transfers the intercepted second signal to terminal 300 via communication circuit 120a in a state where connection C with terminal 300 has been established.

More specifically, controller 130a intercepts the second signal transmitted by lighting apparatus 110b, and stores the second signal in storage 150a. Second signal includes, for example, information indicating the reception of the first signal and information indicating a transmission source (that is, lighting apparatus 110b which transmitted the second signal) of the second signal. Controller 130a transfers the second signal stored in storage 150a to terminal 300 via communication circuit 120a using connection C.

When the first signal received from terminal 300 has been encrypted, controller 130a transfers the encrypted first signal to lighting apparatus 110b via communication circuit 120a irrespective of whether or not the encrypted first signal can be decrypted. In other words, in the case where controller 130a included in lighting apparatus 110a according to this embodiment is in a bridge connection state where connection C with terminal 300 has been established, controller 130a transfers the encrypted first signal to lighting apparatus 110b via communication circuit 120a irrespective of whether or not the encrypted first signal has been decrypted.

Light emitter 140a is a light source which emits illumination light. The specific configuration of light emitter 140a is not limited. Light emitter 140a is, for example, a fluorescent lamp, a light emitting diode (LED), a halogen lamp, or the like.

Storage 150a is a storage device for storing a signal received by lighting apparatus 110a. More specifically, controller 130a stores, in storage 150a, the intercepted second signal transmitted by lighting apparatus 110b.

Storage 150a is a storage device for storing an encryption key for decrypting the encrypted first signal which is transmitted by terminal 300. For example, when an encryption key for decrypting the first signal is transmitted from terminal 300, controller 130a stores the encryption key onto storage 150a.

Storage 150a is implemented as, for example a read only memory (ROM), a random access memory (RAM), a hard disk drive (HDD), a flash memory, or the like.

Next, a description is given of lighting apparatus 110b for which connection C with terminal 300 has not been established.

Communication circuit 120b is a communication interface for allowing lighting apparatus 110b to perform wireless communication with lighting apparatus 110a.

Controller 130b is a control device which controls communication circuit 120b. Controller 130b receives the first signal transmitted by terminal 300 from lighting apparatus 110a or a lighting apparatus other than lighting apparatus 110a in the same wireless mesh network M, and performs control such as turn on or off or the like of light emitter 140b according to the received first signal. More specifically, when controller 130b receives the first signal transmitted by terminal 300 via communication circuit 120b from lighting apparatus 110a or the other lighting apparatus on the same wireless mesh network M, controller 130b performs control such as turn on or off or the like of light emitter 140b according to the first signal.

Controller 130b, when in an un-associated state where controller 130b cannot perform encryption communication with terminal 300, transfers the encrypted first signal to the other lighting apparatus via communication circuit 120b.

Controller 130b, when in an associated state where controller 130b can perform encryption communication with terminal 300, transfers the encrypted first signal to the other lighting apparatus via communication circuit 120b when controller 130b can decrypt the encrypted first signal received from terminal 300.

Controller 130b, when in an associated state where controller 130b can perform encryption communication with terminal 300, avoid transferring the encrypted first signal to the other lighting apparatus in the case where controller 130b cannot decrypt the encrypted first signal received from terminal 300.

Here, an associated state is a state where lighting apparatuses 110a and 110b can perform encryption communication with terminal 300 or a terminal which is different from terminal 300. More specifically, the associated state is a state where an encryption key for decrypting (decoding) an encrypted signal has been obtained and stored by means of lighting apparatuses 110a and 110b performing wireless communication with terminal 300 or the terminal different from terminal 300 (in short, a state where encryption communication can be performed).

An un-associated state is a state where lighting apparatuses 110a and 110b cannot perform encryption communication with terminal 300 and a terminal which is different from terminal 300. More specifically, the un-associated state is a state where no encryption key for decrypting (decoding) an encrypted signal has been obtained and stored by means of lighting apparatuses 110a and 110b performing wireless communication with terminal 300 or the terminal different from terminal 300 (in short, a state where encryption communication cannot be performed).

For example, when lighting apparatuses 110a and 110b have obtained an encryption key from the terminal different from terminal 300, lighting apparatuses 110a and 110b are placed into an associated state, but cannot decrypt the encrypted first signal transmitted by terminal 300.

In other words, when controller 130b has received the encrypted first signal from terminal 300 via communication circuit 120b and an encryption key for decrypting the received encrypted first signal has been stored in storage 150b, controller 130b transfers the encrypted first signal to the other lighting apparatus on wireless mesh network M via communication circuit 120b.

Furthermore, when controller 130b has received the encrypted first signal from terminal 300 via communication circuit 120b but an encryption key for decrypting the encrypted first signal has not been stored in storage 150b, controller 130b avoid transferring the encrypted first signal to the other lighting apparatus on wireless mesh network M via communication circuit 120b. In other words, when an encryption key for decrypting the encrypted signal transmitted from the terminal different from terminal 300 has been stored in storage 150b instead of the encryption key for decrypting the encrypted first signal, controller 130b avoids transferring the received encrypted first signal to the other lighting apparatus included in lighting system 100 via communication circuit 120b.

When controller 130b is in an un-associated state where no encryption key has been obtained from terminal 300 or the terminal different from terminal 300, that is, where no encryption key has been stored in storage 150b, controller 130b transfers the encrypted first signal to the other lighting apparatus on wireless mesh network M via communication circuit 120b.

When receiving the first signal via communication circuit 120b, controller 130b generates a second signal indicating the reception of the first signal, and transmits the second signal (mesh signal) to terminal 300 by unicast U.

It should be noted that, when the first signal has been encrypted and an encryption key for decrypting the encrypted first signal has been stored, controller 130b decrypts the first signal, generates the second signal indicating the reception of information relating to control of lighting apparatus 110b included in the first signal to terminal 300 by unicast U.

Controller 130b is configured with, for example, a CPU and a control program stored in storage 150b.

Light emitter 140b is a light source which emits illumination light. The specific configuration of light emitter 140b is not limited. For example, light emitter 140b is a fluorescent lamp, an LED, a halogen lamp, or the like.

Storage 150b is a storage device for storing an encryption key for decrypting the encrypted first signal which is transmitted by terminal 300. For example, when an encryption key for decrypting the encrypted first signal has been transmitted by terminal 300, controller 130b stores the encryption key onto storage 150b.

Storage 150b is implemented as, for example, a ROM, a RAM, an HDD, a flash memory, or the like.

As described above, when lighting apparatus 110b returns the second signal indicating the reception of the first signal, lighting apparatus 110a intercepts and stores the second signal. Lighting apparatus 110a transmits (transfers) the stored second signal to terminal 300 via connection C.

Terminal 300 receives the second signal transmitted (returned) by lighting apparatus 110b. In this way, terminal 300 (or an operator who operates terminal 300) can determine whether or not the first signal transmitted by terminal 300 has been transmitted (transferred) to lighting apparatus 110b. For example, terminal 300 may display information indicating the reception of the second signal on the display portion or the like of terminal 300 when terminal 300 has received the second signal. In this way, the operator of terminal 300 can find out whether or not the first signal transmitted by terminal 300 has been transmitted to lighting apparatus 110b.

Here, lighting apparatus 110a, lighting apparatus 110b, and terminal 300 may have a plurality of channels for a certain receiver for transmitting and receiving a signal in communication circuit 120a, communication circuit 120b, or terminal 300. A channel here is, for example, a signal frequency. In other words, having a plurality of channels means that it is possible to perform signal transmission and reception using frequencies suitable for each channel. When lighting apparatus 110a, lighting apparatus 110b, and terminal 300 have a plurality of channels, lighting apparatus 110a, lighting apparatus 110b, and terminal 300 transmit signals in sequence using channels for them. When lighting apparatus 110a, lighting apparatus 110b, and terminal 300 have a plurality of channels, lighting apparatus 110a, lighting apparatus 110b, and terminal 300 receive signals supported by any of the plurality of channels for them by repeatedly switching the plurality of channels.

Here, terminal 300 may be in a signal unreceivable state depending on a channel switching timing. In this case, when lighting apparatus 110b transmitted (returned) the second signal to terminal 300 by unicast U, a communication trouble that terminal 300 cannot receive the signal occurs.

Lighting apparatus 110a intercepts and stores the second signal transmitted by lighting apparatus 110b, and transmits (transfers) the stored second signal to terminal 300 via connection C. The communication by connection C is performed while checking that a signal has been received by a communication partner to which the signal was transmitted. Therefore, the communication reliability of connection C is higher than the communication reliability of unicast-U transmission of the second signal (mesh signal) which is transmitted by lighting apparatus 110b. For this reason, it is possible to reliably convey the second signal transmitted by lighting apparatus 110b to terminal 300 by means of lighting apparatus 110a transmitting the second signal via connection C.

[Operation Procedure Taken by Lighting Apparatus]

Next, a description is given of lighting apparatus 110a for which connection C with terminal 300 has been established.

Figure 3:
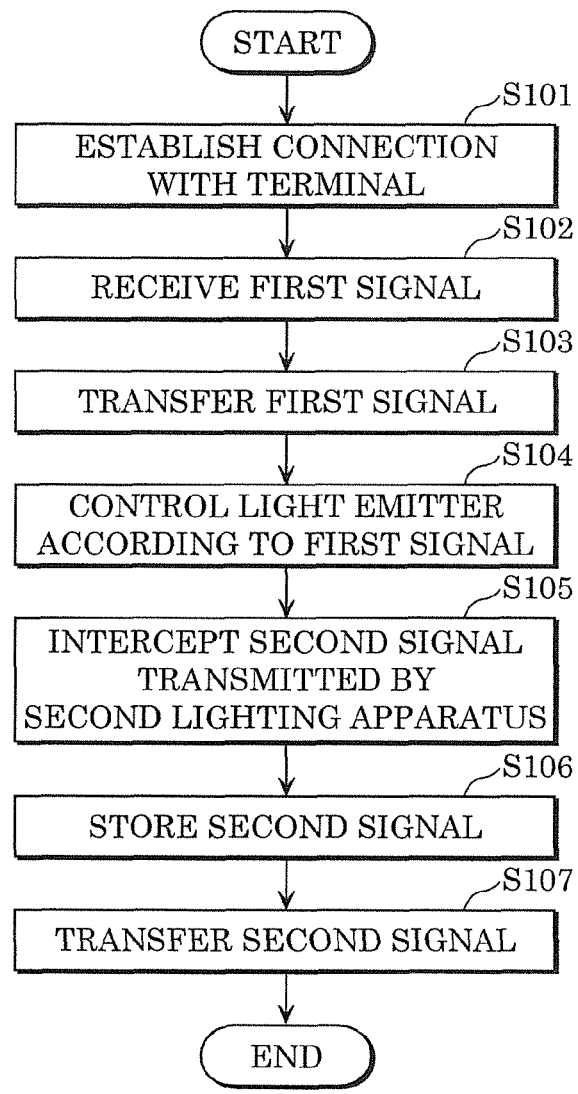
FIG. 3 is a flowchart indicating an operation procedure taken by a lighting apparatus according to this embodiment when the lighting apparatus transmits a signal received from another lighting apparatus included in the lighting apparatuses to a terminal.

FIG. 3 is a flowchart indicating an operation procedure taken by lighting apparatus 110a according to this embodiment when lighting apparatus 110a transmits the signal to terminal after receiving the signal from lighting apparatus 110b.

As illustrated in FIG. 3, an operator operates terminal 300 to establish connection C between terminal 300 and one lighting apparatus among a plurality of lighting apparatuses included in lighting system 100 (Step S101). In lighting system 100 including the plurality of lighting apparatuses, the lighting apparatus for which connection C with terminal 300 has been established in Step S101 is lighting apparatus 110a, and the lighting apparatuses other than lighting apparatus 110a are lighting apparatuses 110b. It is to be noted terminal 300 may automatically establish connection C between terminal 300 and one of the lighting apparatuses according to, for example, the strength of communication with each of the lighting apparatuses.

Lighting apparatus 110a receives a first signal including information according to an operator instruction from terminal 300 (Step S102). More specifically, in Step S102, controller 130a receives the first signal transmitted from terminal 300 via communication circuit 120a.

Next, controller 130a transfers the received first signal to lighting apparatus 110b via communication circuit 120a (Step S103).

Next, controller 130a performs control according to the information that instructs control of light emitter 140a included in the first signal (Step S104). For example, controller 130a turns on light emitter 140a when the first signal includes information that instructs turn on of light emitter 140a.

Next, controller 130a intercepts, via communication circuit 120a, a second signal indicating the reception of the first signal that lighting apparatus 110b has transmitted to terminal 300 (Step S105).

Next, controller 130a stores the intercepted second signal transmitted by lighting apparatus 110b into storage 150a (Step S106).

Next, controller 130a transfers the intercepted second signal transmitted by lighting apparatus 110b and stored in storage 150a, to terminal 300 via communication circuit 120a (Step S107).

It is to be noted that, although controller 130a transmits the intercepted second signal transmitted by lighting apparatus 110b and stored in storage 150a to terminal 300 in the above Step S107, at this time, controller 130a may generate a second signal according to the first signal received via communication circuit 120a, and transmit also the generated second signal.

Figure 4:
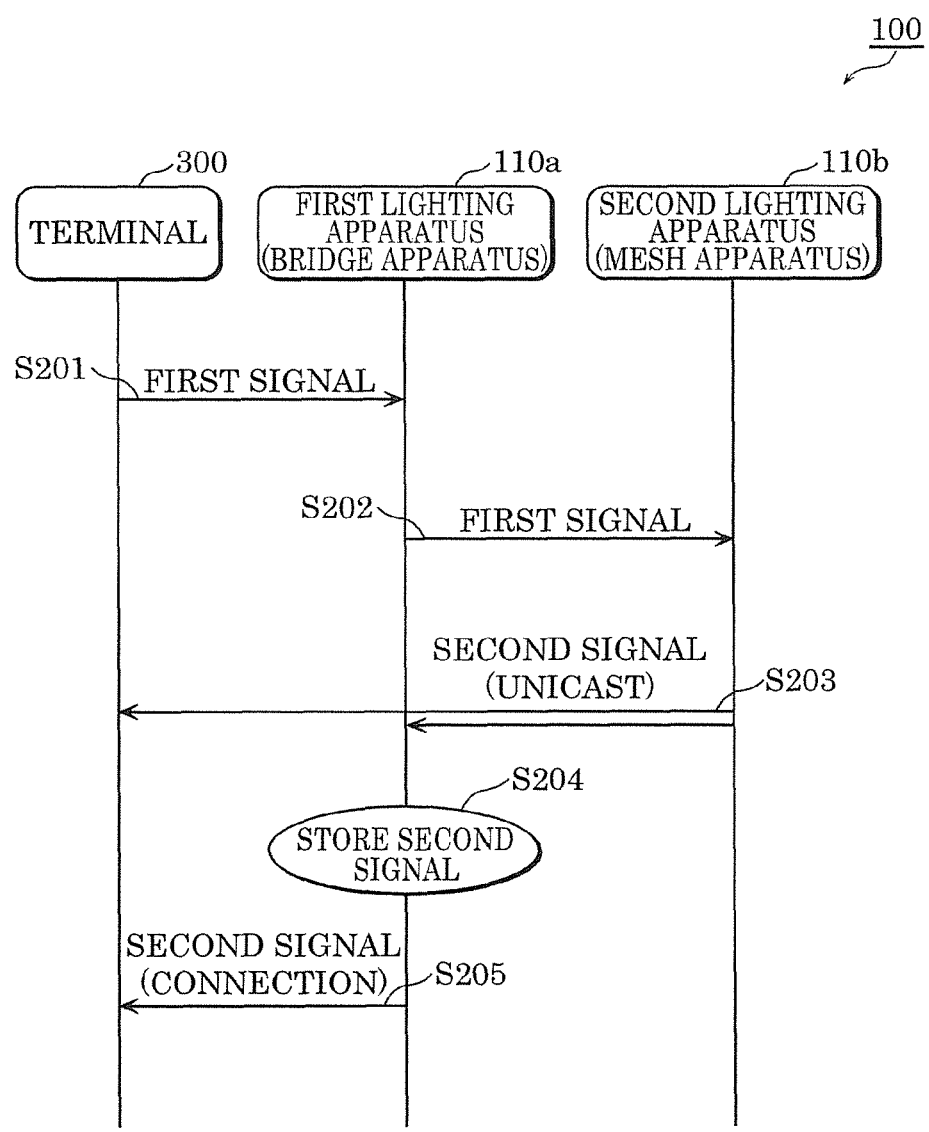
FIG. 4 is a sequence diagram for illustrating an example of paths for transmitting signals in the lighting system including the lighting apparatuses according to this embodiment.

FIG. 4 is a sequence diagram for illustrating an example of paths for transmitting a signal in lighting system 100 including lighting apparatus 110a according to this embodiment. It is to be noted that connection C has been established between terminal 300 and lighting apparatus 110a in advance in lighting system 100 illustrated in FIG. 4. Although lighting system 100 includes one or more lighting apparatuses 110b, only one lighting apparatus 110b is illustrated for explanation. When lighting apparatus 110a and lighting apparatus(es) 110b received a first signal, these apparatuses perform control (not described here) according to the first signal.

As illustrated in FIG. 4, terminal 300 transmits the signal (first signal) including the information according to the operator instruction to lighting apparatus 110a via connection C (Step S201).

Next, lighting apparatus (first lighting apparatus) 110a transfers the received first signal to lighting apparatus (second lighting apparatus) 110b (Step S202). Each of the plurality of lighting apparatuses 110b receives the first signal via wireless mesh network M.

Next, lighting apparatus 110b generates a second signal (mesh signal) indicating the reception of the first signal, and returns the second signal to terminal 300 by unicast U (Step S203).

Next, lighting apparatus 110a intercepts the second signal returned by lighting apparatus 110b and stores the second signal (Step S204).

Next, lighting apparatus 110a transfers the second signal intercepted and stored to terminal 300 via connection C (Step S205). It is to be noted that, in Step S205, lighting apparatus 110a may generate a second signal according to the received first signal, and transmit the generated second signal together with the intercepted second signal transmitted by lighting apparatus 110b.

In addition, although each of the plurality of lighting apparatuses 110b has received the first signal via wireless mesh network M in Step S202, each lighting apparatus 110b may further transfer the first signal to any one or more of the lighting apparatuses included in lighting system 100. The number of times of transferring the first signal may be, for example, included in the first signal, or be stored in advance in a storage of each of the plurality of lighting apparatuses included in lighting system 100.

Next, a description is given of an operation procedure taken by lighting apparatuses 110a and 110b when these apparatuses received an encrypted first signal.

As described above, the first signal to be transmitted by terminal 300 may be encrypted. In this case, the operator transmits, in advance, an encryption key for decrypting the encrypted first signal from terminal 300 to a target lighting apparatus to be controlled by terminal 300. The target lighting apparatus stores the received encryption key, and when receiving the encrypted first signal, decrypts the first signal using the encryption key and performs control according to the first signal. In this way, when the first signal has been transmitted to a lighting apparatus that is not intended by the operator, it is possible to prevent the lighting apparatus that has received the first signal from operating according to the first signal.

Here, as described above, when the operator of terminal 300 controls the plurality of lighting apparatuses, the operator establishes connection C between terminal 300 and one lighting apparatus among the plurality of lighting apparatuses. At this time, terminal 300 may automatically establish connection C with, for example, the lighting apparatus having the strongest communication electric wave among the plurality of lighting apparatuses. In this case, a lighting apparatus that is not a target for control by the operator, for example, a lighting apparatus in which no encryption key for decrypting the encrypted first signal has been stored may automatically establish connection C with terminal 300.

In the case where all lighting apparatuses which do not store any encryption key for decrypting the encrypted first signal and received a first signal are set so as not to transmit the first signal to another one of the lighting apparatuses, it is impossible to control a target lighting apparatus that the operator desires to control using terminal 300. In the opposite case where all lighting apparatuses which do not store encryption key for decrypting the encrypted first signal and received a first signal are set to transmit the first signal to another one of the lighting apparatuses, unnecessary communication of signals between the lighting apparatuses having no encryption key increases and the signals interfere with each other. This may cause a trouble that it is impossible to transmit and receive a signal that is originally desired to be transmitted.

In view of this, in this embodiment, lighting apparatus (first lighting apparatus) 110a which has established connection C with terminal 300 in lighting system 100 including the plurality of lighting apparatuses transfers the first signal to lighting apparatuses 110b irrespective of presence of an encryption key. In addition, lighting apparatuses (second lighting apparatuses) 110b for which connection C with terminal 300 have not been established determines whether or not to transfer the encrypted first signal to another lighting apparatus on wireless mesh network M depending on whether or not to be in an associated state. When lighting apparatuses 110b are in an associated state, lighting apparatuses 110b for which connection C with terminal 300 has not been established determines whether or not to transfer the encrypted first signal to another lighting apparatus on wireless mesh network M depending on whether lighting apparatuses 110b store the encryption key for the received encrypted signal.

Figure 5:
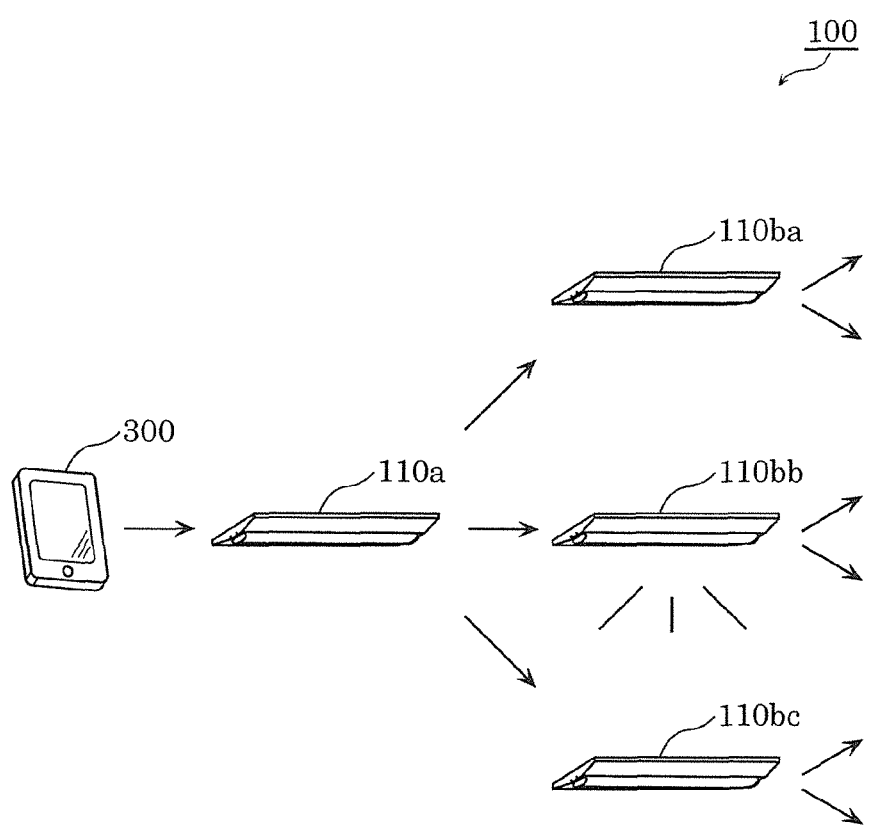
FIG. 5 is a diagram for illustrating an example of operations performed in lighting apparatuses according to this embodiment according to a state between the lighting apparatuses and the terminal.

FIG. 5 is a diagram for illustrating an example of operations performed in lighting apparatuses according to this embodiment according to a state with terminal 300. It is assumed that a first signal illustrated in FIG. 5 has been encrypted and includes an instruction (information) for turning on the lighting apparatuses.

As illustrated in FIG. 5, lighting system 100 includes: lighting apparatus (first lighting apparatus) 110a for which connection C with terminal 300 has been established; and lighting apparatuses (second lighting apparatuses) 110ba, 110bb, and 110bc which are in connectionless communication with terminal 300.

It is assumed that lighting apparatus 110a is in the state of association with a terminal different from terminal 300, and does not store any encryption key for decrypting the encrypted first signal to be transmitted by terminal 300.

In addition, it is assumed that lighting apparatus 110ba is in an un-associated state where lighting apparatus 110ba has not yet been in the state of association with terminal 300 or the terminal different from terminal 300.

In addition, it is assumed that lighting apparatus 110bb is in the state of association with terminal 300, and stores an encryption key for decrypting the encrypted first signal to be transmitted by terminal 300.

It is assumed that lighting apparatus 110bc is in the state of association with the terminal different from terminal 300, and does not store any encryption key for decrypting the encrypted first signal to be transmitted by terminal 300.

Lighting apparatus 110a which has received the encrypted first signal transmitted by terminal 300 transfers the first signal to lighting apparatuses 110ba, 110bb, and 110bc. Since lighting apparatus 110a does not store any encryption key for decrypting the encrypted first signal, lighting apparatus 110a cannot decrypt the first signal, and thus cannot perform control according to the first signal.

Lighting apparatus 110ba which has received the encrypted first signal transferred by lighting apparatus 110a is in an un-associated state, and thus transfers the first signal to any of lighting apparatuses 110bb and 110bc. Since lighting apparatus 110ba does not store any encryption key for decrypting the encrypted first signal, lighting apparatus 110ba cannot decrypt the first signal, and thus cannot perform control according to the first signal.

Lighting apparatus 110bb which has received the encrypted first signal transferred by lighting apparatus 110a is in an associated state and stores an encryption key for decrypting the encrypted first signal, and thus transfers the first signal to any of lighting apparatuses 110ba and 110bc. Lighting apparatus 110bb decrypts the first signal using the encryption key, and performs control according to the first signal. For example, lighting apparatus 110bb turns on according to the first signal.

Lighting apparatus 110bc which has received the encrypted first signal transferred by lighting apparatus 110a is in an associated state and does not store any encryption key for decrypting the encrypted first signal, and thus avoid transferring the first signal to any of lighting apparatuses 110ba and 110bb. Lighting apparatus 110bc does not store any encryption key for decrypting the encrypted first signal and cannot decrypt the first signal, and thus cannot perform control according to the first signal.

Figure 6:
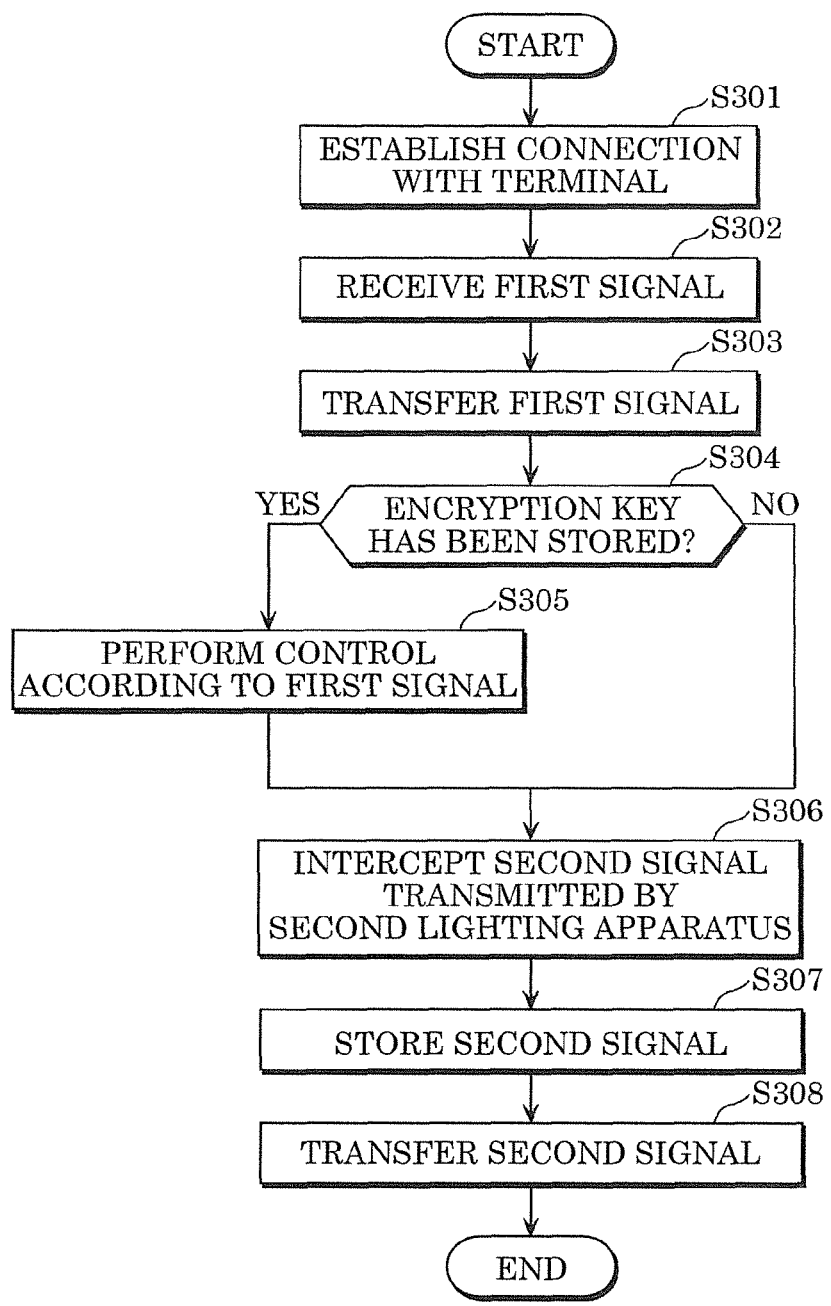
FIG. 6 is a flowchart indicating an operation procedure taken by one of the lighting apparatuses according to this embodiment to transmit a signal received from the terminal when the lighting apparatus and the terminal are in connection-oriented communication.

FIG. 6 is a flowchart indicating an operation procedure taken by a lighting apparatus according to this embodiment to transmit a signal received from terminal 300 when the lighting apparatus is in connection-oriented communication with terminal 300. More specifically, FIG. 6 is a flowchart indicating the operation procedure taken when lighting apparatus (first lighting apparatus) 110a has received the encrypted first signal.

As illustrated in FIG. 6, an operator operates terminal 300, and establishes connection C between terminal 300 and one lighting apparatus among the plurality of lighting apparatuses included in lighting system 100 (Step S301). In lighting system 100 including the plurality of lighting apparatuses, the lighting apparatus in connection-oriented communication with terminal 300 in Step S301 is lighting apparatus 110a, and the lighting apparatuses other than lighting apparatus 110a are lighting apparatuses 110b.

Lighting apparatus 110a receives the encrypted first signal from terminal 300 (Step S302). More specifically, in Step S302, controller 130a receives the first signal transmitted from terminal 300 via communication circuit 120a.

Next, controller 130a transfers the received encrypted first signal to lighting apparatus 110b via communication circuit 120a (Step S303). In other words, lighting apparatus 110a which has established connection C with terminal 300 transfers the received first signal to lighting apparatus 110b via communication circuit 120a irrespective of whether lighting apparatus 110a is in an associated state or in an un-associated state.

Next, controller 130a determines whether or not an encryption key for decrypting the encrypted first signal has been stored in storage 150a (Step S304).

When controller 130a determines that the encryption key for decrypting the encrypted first signal has been stored in storage 150a (Yes in Step S304), controller 130a decrypts the first signal using the encryption key, and controls light emitter 140a according to the first signal (Step S305).

Next to Step S305, or when controller 130a has determined that the encryption key for decrypting the encrypted first signal has not been stored in storage 150a (No in Step S304), controller 130a intercepts, from lighting apparatus 110b, a second signal indicating that first signal has been received and decrypted via communication circuit 120a (Step S306).

Next, controller 130a stores the intercepted second signal transmitted by lighting apparatus 110b (second lighting apparatus) onto storage 150a (Step S307).

Next, controller 130a transfers the intercepted second signal transmitted by lighting apparatus 110b and stored in storage 150a to terminal 300 (Step S308). It is to be noted that, in Step S308, controller 130a may generate a second signal according to the first signal received via communication circuit 120a, and transmit the generated second signal together with the intercepted second signal transmitted by lighting apparatus 110b.

Figure 7:
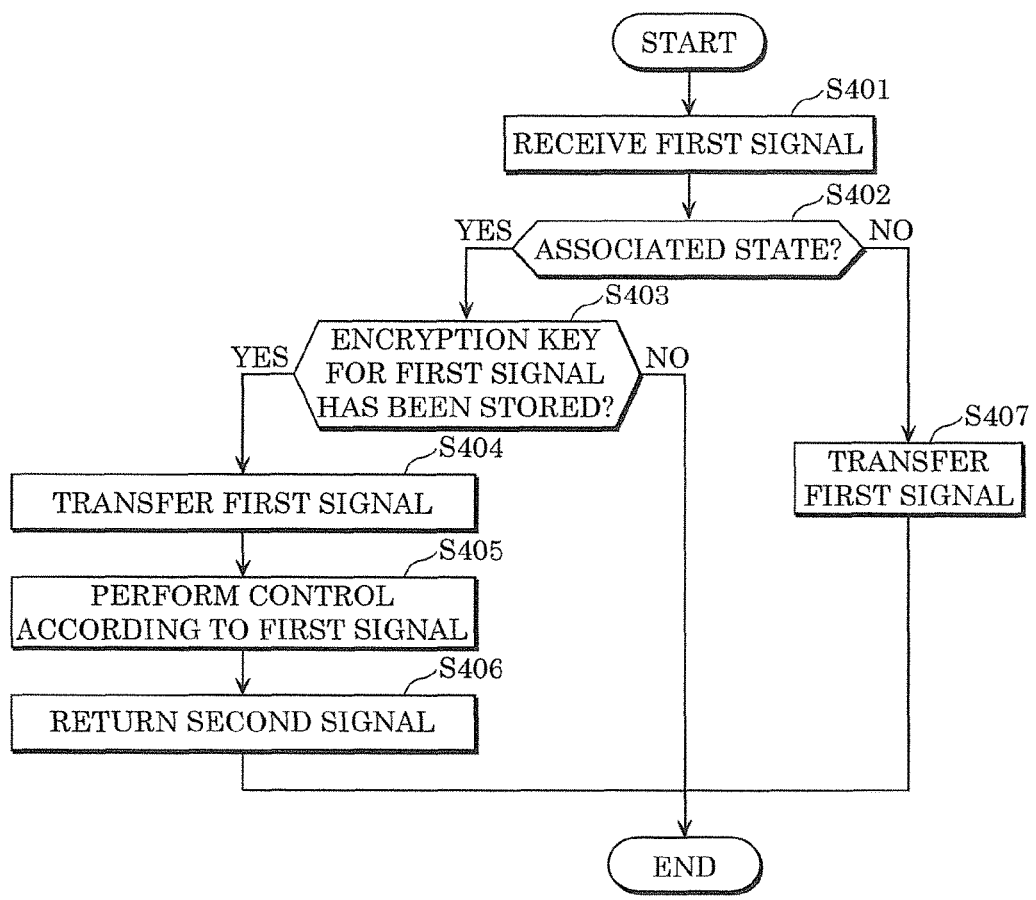
FIG. 7 is a flowchart indicating an operation procedure taken by a lighting apparatus according to this embodiment to determine whether or not the lighting apparatus transmits a signal received from the terminal when the lighting apparatus and the terminal are in connectionless communication.

FIG. 7 is a flowchart indicating an operation procedure taken by a lighting apparatus according to this embodiment to determine whether or not to transmit a signal received from terminal 300 when connection C with terminal 300 has not been established for the lighting apparatus. More specifically, FIG. 7 is a flowchart indicating the operation procedure taken by lighting apparatus (second lighting apparatus) 110b when the apparatus has received the encrypted first signal.

As illustrated in FIG. 7, lighting apparatus 110b receives the encrypted first signal transmitted by terminal 300 from lighting apparatus 110a or a lighting apparatus other than lighting apparatus 110a on the same wireless mesh network M (Step S401). More specifically, in Step S401, controller 130b receives, via communication circuit 120b, the encrypted first signal transmitted by terminal 300 from lighting apparatus 110a or the lighting apparatus other than lighting apparatus 110a on the same wireless mesh network M.

Next, controller 130b determines whether or not lighting apparatus 110b is in an associated state (Step S402). More specifically, controller 130b obtains an encryption key from terminal 300 or a terminal other than terminal 300, and determines whether or not an encryption key has been stored in storage 150b.

When controller 130b determines that the encrypting key has been stored in storage 150b (Yes in Step S402), controller 130b determines whether or not the encryption key is an encryption key for decrypting the received encrypted first signal (Step S403).

When controller 130b determines that the encryption key stored in storage 150b is an encryption key for decrypting the received encrypted first signal (Yes in Step S403), controller 130b transfers the first signal to another lighting apparatus on wireless mesh network M via communication circuit 120b (Step S404).

Next, controller 130b decrypts the first encrypted signal using the encryption key, and performs control according to the first signal (Step S405).

Next, controller 130b generates a second signal indicating that the encrypted first signal has been received and decrypted, and returns the second signal to terminal 300 by unicast U via communication circuit 120a (Step S406).

When controller 130b determines that the encryption key is not an encryption key for decrypting the received encrypted first signal (No in Step S403), controller 130b avoids transferring the first signal.

When controller 130b determines that no encryption key has been stored in storage 150b (No in Step S402), controller 130b transfers the received encrypted first signal to the other lighting apparatus on wireless mesh network M via communication circuit 120b (Step S407).

Effects etc.

The lighting apparatus according to the embodiment is included in the lighting apparatuses in wireless mesh network M in lighting system 100. Lighting system 100 includes the plurality of lighting apparatuses and terminal 300 which performs wireless communication with the lighting apparatus. Lighting apparatus 110a includes: communication circuit 120a which performs wireless communication; and controller 130a which controls communication circuit 120a. When lighting apparatus 110b included in the plurality of lighting apparatuses transmitted a signal to terminal 300 using wireless communication, controller 130a receives the signal via communication circuit 120a, and transmits the signal to terminal 300 via communication circuit 120a.

With this configuration, not only lighting apparatus(es) 110b but also lighting apparatus 110a transmit (transfer) the second signals) transmitted (returned) by lighting apparatus (es) 110b to terminal 300. In this way, the possibility that the second signal transmitted by lighting apparatus 110b is not received by terminal 300 is reduced. In short, lighting apparatus 110a increases the communication reliability.

In addition, controller 130a receives the signal via communication circuit 120a by scanning a channel for use in the wireless communication, and transmits the signal to terminal 300 via communication circuit 120a in a state where a connection between controller 130a and terminal 300 has been established.

Terminal 300 such as a smartphone may be alternately in a signal receivable state and a signal unreceivable state. In such a case, terminal 300 cannot receive the signal (second signal) transmitted by lighting apparatus 110b depending on a signal reception timing. However, with this configuration, lighting apparatus 110a intercepts the second signal transmitted by lighting apparatus 110b and transfers the second signal to terminal 300 via connection C. In this way, the possibility that the second signal transmitted by lighting apparatus 110b is not received by terminal 300 is further reduced. In short, lighting apparatus 110a further increases the communication reliability.

In addition, controller 130a may transfer an encrypted signal received from terminal 300 to lighting apparatus 110b (one or more lighting apparatuses included in the plurality of lighting apparatuses in lighting system 100) via communication circuit 120a irrespective of whether or not controller 130a can decrypt the encrypted signal when controller 130a is in a bridge connection state where a connection between controller 130a and terminal 300 has been established.

With this configuration, even when connection C has been established for a lighting apparatus that is unintended by the operator of terminal 300, the first signal is transferred. This produces the possibility that the first signal is received by a target lighting apparatus intended by the operator.

In addition, controller 130b may transfer an encrypted signal received from terminal 300 to lighting apparatus 110b (one or more lighting apparatuses included in the plurality of lighting apparatuses in lighting system 100) via communication circuit 120b when lighting apparatus 110b is in an un-associated state where lighting apparatus 110b cannot perform encryption communication with terminal 300.

With this configuration, even when connection C has been established for a lighting apparatus that is unintended by the operator of terminal 300, the first signal is transferred. Thus, the possibility that the first signal is received by a target lighting apparatus intended by the operator is increased.

In addition, when lighting apparatus 110b is in an associated state where lighting apparatus 110b can perform encryption communication with terminal 300, controller 130b may transfer the encrypted signal received from terminal 300 to lighting apparatus 110b (one or more lighting apparatuses included in the plurality of lighting apparatuses in lighting system 100) via communication circuit 120b in the case where controller 130b can decrypt the encrypted signal received from terminal 300. In addition, controller 130b may avoid transferring the encrypted signal to lighting apparatus 110b in the case where controller 130b cannot decrypt the encrypted signal received from terminal 300.

With this configuration, lighting apparatus 110b for which connection C with terminal 300 has not been established determines whether or not to transmit (transfer) the encrypted first signal transmitted via wireless mesh network M to another lighting apparatus on wireless mesh network M depending on whether or not lighting apparatus 110b stores an encryption key for decrypting the first signal. Lighting apparatus 110b avoid transferring the first signal to the other lighting apparatus when a first signal whose encryption key has not been stored was transmitted. In this way, when a first signal was received by lighting apparatus 110b unintended by the operator of terminal 300, no first signal is additionally transferred. In short, unnecessary signal communication between the plurality of lighting apparatuses is reduced.

OTHER EMBODIMENTS

Although the lighting apparatuses etc. according to the embodiment have been described above, the present disclosure is not limited to the above embodiment.

Controllers 130a and 130b are implemented in a software-based manner by means of a processor executing a program in the above embodiment. However, this way of implementation is a non-limiting example. Controllers 130a and 130b may be implemented in a hardware-based manner, for example, as an exclusive electronic circuit using a gate array etc.

Lighting system 100 is configured to include the plurality of lighting apparatuses and the terminal in the above embodiment, but this configuration is a non-limiting example. For example, the lighting system may include a relay which transfers a received signal. The relay may establish connection C with the terminal.

In the above non-limiting embodiment, when lighting apparatus 110b transmitted the second signal to terminal 300 by wireless communication, controller 130a intercepts the transmitted second signal via communication circuit 120b, and transfers the intercepted second signal to terminal 300 via communication circuit 120b. However, for example, lighting apparatus 110b may transmit the second signal to terminal 300 and lighting apparatus 110a by wireless communication.

In addition to this, the present disclosure covers and encompasses embodiments that a person skilled in the art may arrive at by adding various kinds of modifications to any of the above embodiments or by arbitrarily combining some of the constituent elements in the respective embodiments within the scope of the present disclosure.

What is claimed is:

1. A lighting apparatus among a plurality of lighting apparatuses in a wireless mesh network in a lighting system, wherein the lighting system includes the plurality of lighting apparatuses and a terminal which performs wireless communication with the lighting apparatus, the lighting apparatus comprising:
   a communication circuit which performs wireless communication; and
   a controller which controls the communication circuit, wherein:
   the controller establishes, with the terminal, a connection which is an exclusive virtual communication path, and performs connection-oriented communication with the terminal,
   when another lighting apparatus included in the plurality of lighting apparatuses transmits a signal to the terminal using wireless communication, the controller receives the signal via the communication circuit by scanning a channel for use in the wireless communication, and transmits the signal to the terminal via the communication circuit in a state where the connection between the controller and the terminal has been established, and
   in the connection-oriented communication, the signal is transmitted at predetermined connection interval periods.

2. The lighting apparatus according to claim 1, wherein the controller transfers an encrypted signal received from the terminal to one or more lighting apparatuses included in the plurality of lighting apparatuses via the communication circuit irrespective of whether or not the controller can decrypt the encrypted signal.

3. The lighting apparatus according to claim 1, wherein the controller transfers an encrypted signal received from the terminal to one or more lighting apparatuses included in the plurality of lighting apparatuses via the communication circuit when the lighting apparatus is in an un-associated state where the lighting apparatus cannot perform encryption communication with the terminal.

4. The lighting apparatus according to claim 1, wherein when the lighting apparatus is in an associated state where the lighting apparatus can perform encryption communication with the terminal, the controller transfers the encrypted signal received from the terminal to one or more lighting apparatuses included in the plurality of lighting apparatuses via the communication circuit in a case where the controller can decrypt the encrypted signal received from the terminal, and avoid transferring the encrypted signal to the one or more lighting apparatuses in a case where the controller cannot decrypt the encrypted signal received from the terminal.

5. A communication method performed by a lighting apparatus among a plurality of lighting apparatuses in a wireless network in a lighting system, wherein the lighting system includes the plurality of lighting apparatuses and a terminal which performs wireless communication with the lighting apparatus, the communication method comprising:

establishing a connection, which is an exclusive virtual communication path, between the lighting apparatus and the terminal, and performing connection-oriented communication between the lighting apparatus and the terminal;

receiving a signal when another lighting apparatus included in the plurality of lighting apparatuses transmits the signal to the terminal using the wireless communication;

receiving the signal by scanning a channel for use in the wireless communication; and transmitting the signal to the terminal in a state where the connection between the lighting apparatus and the terminal has been established, wherein in the connection-oriented communication, the signal is transmitted at predetermined connection interval periods.

6. The communication method according to claim 5, further comprising:

transferring an encrypted signal received from the terminal to one or more lighting apparatuses included in the plurality of lighting apparatuses irrespective of whether or not the lighting apparatus can decrypt the encrypted signal.

7. The communication method according to claim 5, further comprising:

transferring the encrypted signal received from the terminal to one or more lighting apparatuses included in the plurality of lighting apparatuses when the lighting apparatus is in an un-associated state where the lighting apparatus cannot perform encryption communication with the terminal.

8. The communication method according to claim 5, further comprising:

when the lighting apparatus is in an associated state where the lighting apparatus can perform encryption communication with the terminal, transferring, by the lighting apparatus, the encrypted signal received from the terminal to one or more lighting apparatuses included in the plurality of lighting apparatuses in a case where the controller can decrypt the encrypted signal received from the terminal, and avoiding transferring, by the lighting apparatus, the encrypted signal to the one or more lighting apparatuses in a case where the controller cannot decrypt the encrypted signal received from the terminal.

9. A lighting system, comprising:

a bridge lighting apparatus;

one or more mesh lighting apparatuses; and a terminal, wherein:

the bridge lighting apparatus and the one or more mesh lighting apparatuses constitute a wireless mesh network, the terminal is configured to perform wireless communication with the bridge lighting apparatus and the one or more mesh lighting apparatuses, the bridge lighting apparatus includes:

a communication circuit which performs wireless communication; and a controller which controls the communication circuit, the controller establishes, with the terminal, a connection which is an exclusive virtual communication path, and performs connection-oriented communication with the terminal, when one of the one or more mesh lighting apparatuses transmits a signal to the terminal using wireless communication, the controller receives the signal via the communication circuit by scanning a channel for use in the wireless communication, and transmits the signal to the terminal via the communication circuit in a state where the connection between the controller and the terminal has been established, and in the connection-oriented communication, the signal is transmitted at predetermined connection interval periods.

* * * * *